Jan. 10, 1956 G. B. GUTHRIE 2,729,870
ROLLER TOOL JIGGERING MACHINE
Filed Aug. 7, 1952 4 Sheets-Sheet 1

INVENTOR.
George B. Guthrie
BY *Wett, Mackey + Burden*
HIS ATTORNEYS

INVENTOR.
George B. Guthrie

Jan. 10, 1956  G. B. GUTHRIE  2,729,870
ROLLER TOOL JIGGERING MACHINE

Filed Aug. 7, 1952  4 Sheets-Sheet 3

INVENTOR.
George B. Guthrie
BY *Welt, Mackey + Burden*
HIS ATTORNEYS

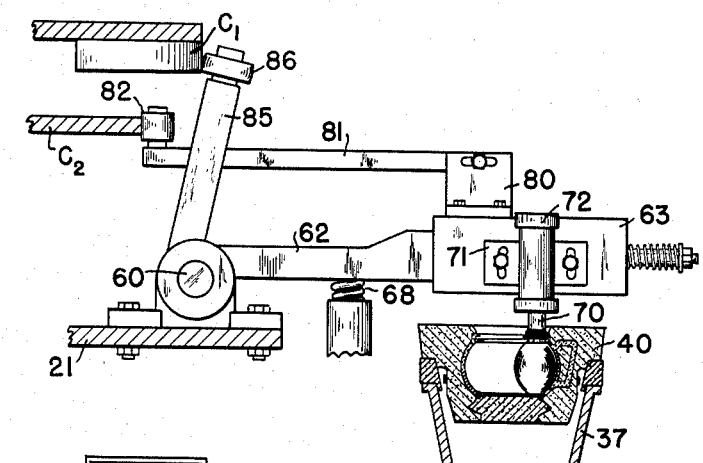
Fig. 8
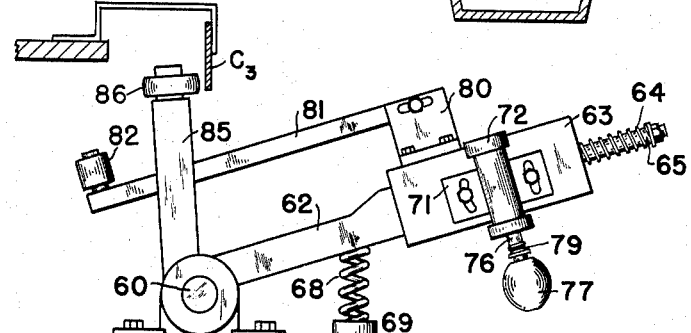
Fig. 9
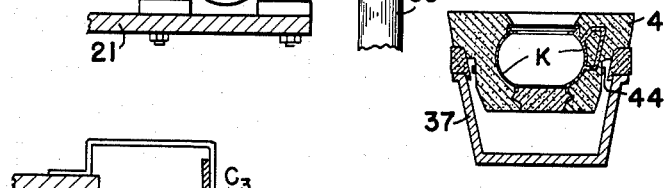
Fig. 10
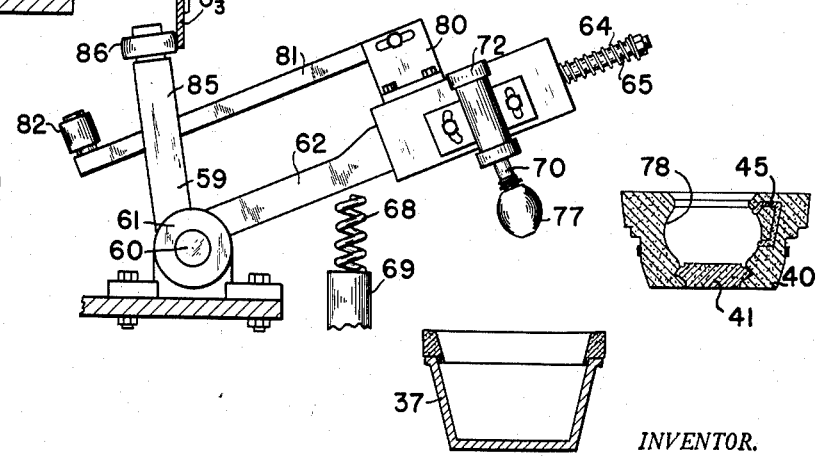
INVENTOR.
George B. Guthrie
HIS ATTORNEYS

United States Patent Office 2,729,870
Patented Jan. 10, 1956

2,729,870

ROLLER TOOL JIGGERING MACHINE

George B. Guthrie, Chester, W. Va., assignor to The Hall China Company, East Liverpool, Ohio, a corporation of Ohio Application August 7, 1952, Serial No. 303,105

12 Claims. (Cl. 25—24)

The present invention relates to a roller tool jiggering machine for forming containers from a deformable, hardenable material and, more particularly, for forming ceramic ware such as a teapot from clay.

The machines known to the prior art for forming ceramic ware are characterized by their low rate of production with a resulting high cost in the articles produced. This shortcoming arises primarily because of the limitations in speed inherent in such machines and because of the need for at least a satisfactory compaction of the clay during the forming operation.

The present machine provides apparatus that is adapted to very high speeds and obtains excellent compaction of the clay. The apparatus embodies a multiple-forming step so that the simultaneous shaping of many containers coupled with the high speed feature enables the machine to produce ware at a rate which exceeds by several hundred percent the rate realized by any of the prior machines.

In one form, the invention comprises a turntable having a plurality of molds and a plurality of forming means, each including a roller tool, stationed over the molds. As the turntable moves, each forming means performs the same function within its assigned mold but in an overlapping time relation with respect to the others. A novel actuating arrangement for the forming means coacts with the movement of the turntable to insert the roller tool into a mold, control its relative movement therein, and later withdraw the tool, all at a desired time and in synchronism with the over-all operation of the machine.

The accompanying drawings illustrate a presently preferred embodiment of the invention wherein.

Figure 4:
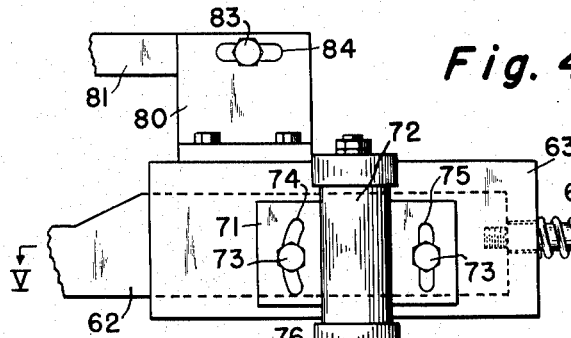
Figure 4 is a side elevation of the forming means and a vertical section of the mold and supporting head.

Figures 7, 8, 9, and 10 are views similar to Figure 4 illustrating in addition the cam arrangement for actuating the forming means and the relative positions of the parts involved at different phases of one revolution of the turntable.

Structure

Referring to the drawings, this embodiment comprises a base 15 having an opening to receive a socket 16. A post 17 fits in the socket, and a bolt 18 passing through a threaded opening in the socket holds the post in a fixed position. A relatively large drive sheave 19 and turntables 20 and 21 rotate about the post 17 on abutting tubular shafts 23 and 22, respectively, which are concentric with the post. The tubular shaft 23 terminates at the bottom in a flange bearing 24 which rotates about the post on the upper race of a ball bearing 25 having its lower race seated in a recess in the socket 16. The upper tubular shaft 22 terminates in a bearing 26 having a flange 27 to seat the outer race of a radially disposed ball bearing 28, the inner race bearing against the post. A cap 29 maintains the parts in position and prevents any upward thrust. Cams $C_1$, $C_2$, and $C_3$ are fixed to the top of the post by means of a key 30.

Figure 3:
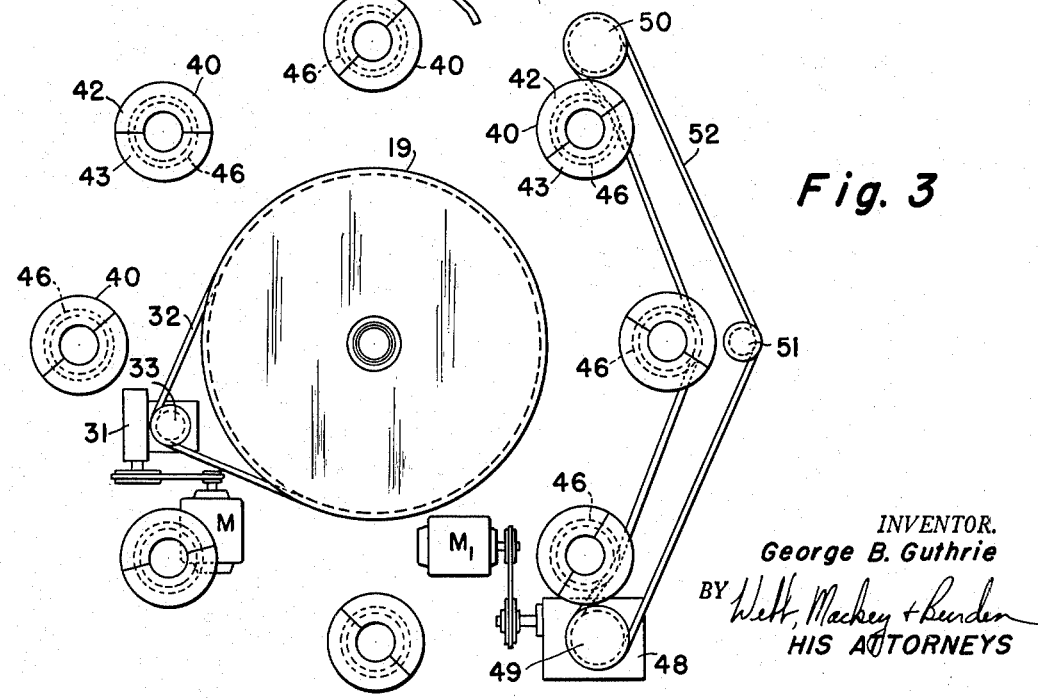
Figure 3 is a section on the line III—III of Figure 1.

As shown in Figure 3, a motor M drives a gear reducer 31 which, in turn, conventionally rotates the large sheave 19 by a drive belt 32 that passes around the sheave and a pulley 33 of the gear reducer. The turntable in Figure 1 consists of an axial support 34 having a flange 35 to which a platform 36 is bolted. A plurality of substantially pot-shaped heads 37 are radially disposed along the circumference of the platform and are supported on spindles 38. The spindles extend through the platform 36 and are journalled for rotation in suitable bearings 39. Each head 37 supports a mold 40 on its periphery. The mold is of the split type consisting of a bottom 41 and two halves or sides 42 and 43. An elastic band or belt 44 holds the members together. At the vertical plane of cleavage defining the division of the two sides 42 and 43 of each mold there is a groove cut in one or both of adjacent contacting sides to accommodate a preformed handle 45.

Figure 1:
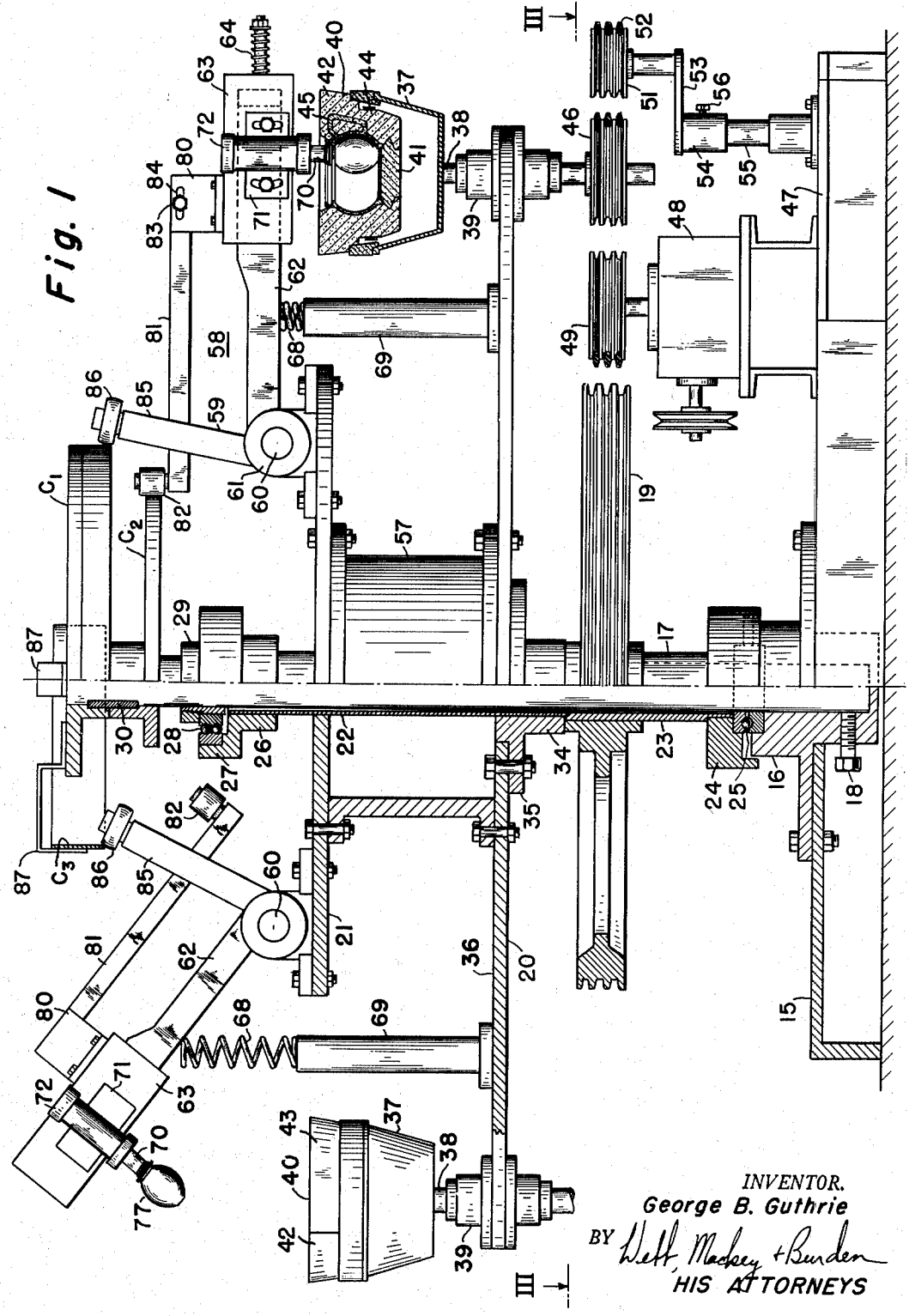
Figure 1 is a side elevation, partially in section, showing a general arrangement of parts.

The lower part of each spindle has a fixed sheave 46. Referring again to Figure 3, the sheaves and, therefore, the spindles are rotated by a motor $M_1$ stationed on an extension 47 to the base 15. The motor drives a gear reducer 48 having a pulley 49 which in cooperation with idler pulleys 50 and 51 forms a path of travel for a drive belt 52. The belt extends only partially around the turntable 20 since it is necessary to rotate the spindles during only a portion of their travel around the post. In traversing this path, the drive belt 52 presses against the sheaves 46 on the spindles in that area, thereby imparting a spinning motion. Preferably, the drive belt is driven so that the length thereof actually contacting the sheaves travels in a direction opposite to that of the turntable 20. In this manner, the two speeds involved are additive with respect to rotating the spindles at a very high rate. The position of the idler pulley 50 or pulley 51, or both, may be regulated to adjust the tension in the drive belt and its pressure against the sheaves. As shown in Figure 1, pulley 51 is mounted on a connecting arm 53 having a socket 54 at one end which fits over a supporting standard 55 fixed to the extension 47. The arm 53 may be locked in any desired position by suitable means such as a set screw 56.

Figure 5:
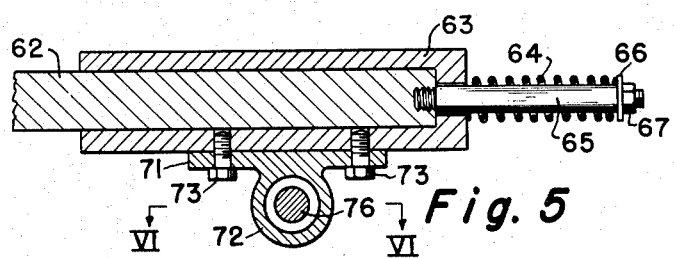
Figure 5 is a section on the line V—V of Figure 4.

A collar 57 spaces the second turntable 21 above the first and is bolted to both at its flanges. The turntable 21 supports a plurality of forming means generally indicated at 58 which are individually stationed over the molds in substantial vertical alignment. Each forming means consists of a radially disposed bell crank lever 59 having a pin 60 journalled in bearings 61. A bottom arm 62 of the lever has a sleeve 63 at one end adapted for axial movement. As shown best by Figures 4 and 5, a spring 64 coiled about a finger 65 opposes outward movement of the sleeve. The finger has threaded ends, one of which passes through an opening in the end of the sleeve to engage an aligned threaded recess in the arm 62, while the other has a washer 66 backed by a nut 67. Consequently, the compressible spring 64 bears at one end against the movable sleeve 63, and at the other against the washer 66. Another compressible coiled spring 68 (Figure 1) opposes the downward movement of the arm 62. A tubular container 69 fixed to the turntable 20 houses the spring.

Figure 6:
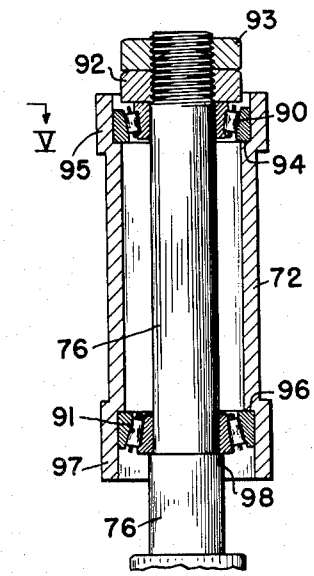
Figure 6 is a section of the roller tool on the line VI—VI of Figure 5.

On one side, the sleeve 63 supports a roller tool 70 by means of a plate 71 having a bearing housing 72 fixed thereto. Bolts 73 hold the plate against the sleeve by passing through slots in the plate. One slot 74 is curved while the other slot 75 is straight to provide both vertical and angular adjustments for the roller tool. As shown in Figure 6, the roller tool comprises a coaxial bearing housing 72 and a shaft 76. A pair of roller bearings 90 and 91 radially space the shaft from the housing and allow the shaft to rotate easily. The upper end of the shaft is threaded to receive a nut 92 backed by a lock nut 93. There is no downward movement of the shaft since the nut 92 bears against the inner race of roller bearing 90, while the outer race of that bearing engages a seat 94 provided by an outwardly offset end 95 of the housing. On the other hand, upward movement of the shaft is prevented by a similar arrangement at the bottom of the housing. Here the outer race of roller bearing 91 engages a seat 96 provided by the outwardly offset end 97, while the inner race seats against a shoulder portion 98 on the shaft. The working surface 77 at the end of the shaft 76 and the inside of the mold have complementary configurations to that desired on the inside and outside, respectively, of the container to be produced, here illustrated as a teapot 78. At the upper end of the working surface there are two forming rings 79 which simultaneously shape a level shelf-like portion for supporting a cover for the teapot and an upper lip.

Figure 2:
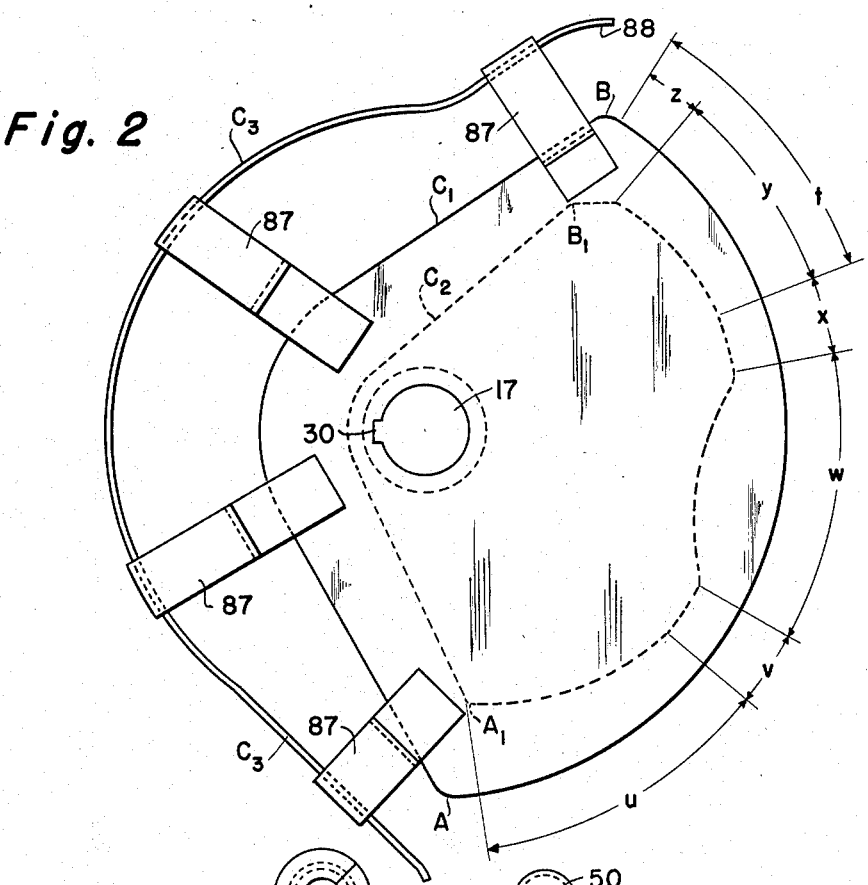
Figure 2 is a plan view of Figure 1 illustrating the cams and their relative positions.

Referring again principally to Figure 1, the sleeve 63 also has a bracket 80 bolted to the sleeve. The bracket carries a strut 81 provided with a cam follower 82 for constant engagement with cam $C_2$. A bolt 83 fixes the strut to the bracket by passing through an opening 84 which is slotted to allow axial adjustment for the strut. An upper arm 85 of the bell crank lever also has a cam follower 86 which contacts either cam $C_1$ or cam $C_3$. The three cams are disposed at the top of the post 17 as shown in Figure 2. Cams $C_1$ and $C_2$ are substantially sector-shaped and superposed, while cam $C_3$ is in the form of a curved strip. Cam $C_3$ is on a plane with cam $C_1$ to provide substantially 360° of cam-controlled action for the bell crank lever 59. Cross bars 87 secure the cam strip $C_3$ to cam $C_1$.

*Operation*

The preformed handle 45 is initially placed in the groove formed in the sides 42 and 43 of the mold which are then held in assembled relation with the bottom 41 by the band 44. After the mold is placed in a head 37, a charge of clay K is added, and as the turntable 20 and supporting heads are rotated by the motors M and $M_1$ in the manner previously explained, the mold begins its travel around the post 17. During this time, the clay is forced by the roller tool 70 upwardly along the sides of the mold into a desired shape, while the action of the tool is controlled by the cams.

Figure 7:
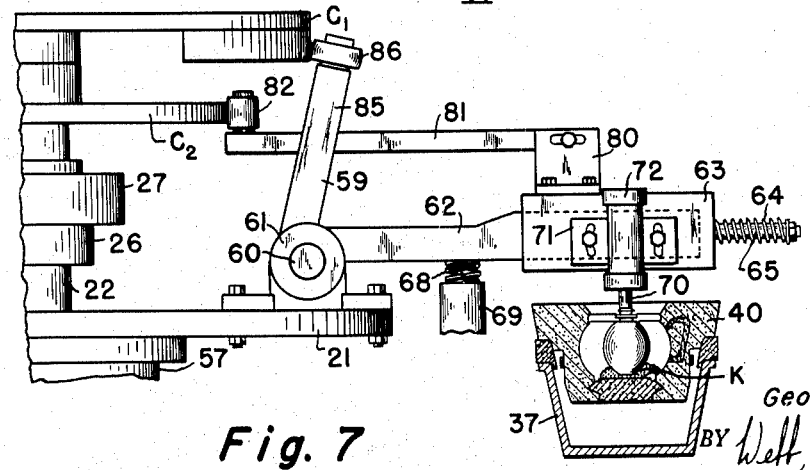

For example, arbitrarily beginning the cycle at the point where cam $C_1$ first contacts the upper arm 85 of the bell crank lever, continued movement of the turntable 21 causes cam $C_1$ to pivot the lever 59 on the pin 60, thereby lowering the bottom arm 62, compressing the spring 68, and inserting the tool 70 into a mold. The parts are now positioned as shown in Figure 7. As the tool frictionally engages the rotating mold, it also begins to rotate. Since the tool is contained within the mold throughout the forming step, the radius of cam $C_1$ as from point A in Figure 2 counterclockwise to point B is substantially the same. However, it has been found that a better bottom is formed in the teapot if the tool is raised slightly, on the order of 10 mils or so, during the travel designated "$t$" and while the tool is retracting as hereafter explained.

The action of cam $C_2$ is substantially concurrent with that of cam $C_1$. As the cam follower 82 runs from point $A_1$ counterclockwise to point $B_1$ on cam $C_2$, the strut 81 and, therefore, the sleeve 63 and tool 70 are pushed outwardly during the travel $u$. For the short period $v$, the sleeve and tool are at their maximum outward positions, and the parts are now positioned as shown in Figure 8. Thereafter, through the distance $w$, cam $C_2$ has a shorter radius and the spring 64 pushes the sleeve and tool inwardly. This period may be used, if desired, to insert a lubricant into the mold. In the next period of cam travel $x$, cam $C_2$ again pushes the sleeve and tool to their maximum outward positions, and the parts are again related as shown in Figure 8. This is followed by the period $y$ wherein the sleeve and tool are slowly retracted by the cooperable action of the cam $C_2$ and spring 64. Finally, in period $z$ the sleeve and tool are quickly retracted to the original positions occupied at point $A_1$.

As the cam followers 86 and 82 round the corners B and $B_1$, respectively, in a counterclockwise direction, the pressures on the upper arm 85 and strut 81 are released permitting the compressed spring 68 to eject the bottom arm 62 of the bell crank lever upwardly as shown in Figure 9. This pivoting of the lever 59 throws the upper arm 85 within the end 88 of the strip cam $C_3$. Subsequent movement of the cam follower 86 along the cam $C_3$ maintains the arm 62 and roller tool 70 away from the mold. Since the radius of cam $C_2$ also recedes at this time, there is no interference from the cam follower 82. During this period, the mold with its formed container is removed from the head as shown in Figure 10 and replaced with another mold having a charge of clay designed to be similarly processed. When the point A is again reached, the cam follower 86 once more meets cam $C_1$ and the cycle described is repeated.

Although the foregoing description has been confined to one mold and its corresponding forming means, it will be apparent that the operation is the same for all molds, and that while all molds are used simultaneously, each mold at a given instant is in a different phase of the described cycle.

Very high mold speeds are possible with the present machine. For instance, speeds of 1,000 revolutions per minute can be used and thereby obtain excellent compaction of the clay in a very short period of time. In the prior art casting processes, about 15 containers an hour could be made, whereas by the present machine it is possible to readily produce as many as 1,000 per hour with an attendant appreciable decrease in price per piece.

While the foregoing disclosure describes a presently preferred embodiment, it is understood that the invention may be practiced in other forms within the scope of the following claims.

I claim:

1. Apparatus comprising a platform supporting a plurality of molds, means to rotate the molds, a second platform supporting a plurality of forming means each including an arm pivotable adjacent one end, a sleeve movable along the arm and supporting a tool engageable with the mold, and cam means synchronized with respect to each other to urge the sleeve along the arm, to lower the arm and to raise the arm and thereby maintain the tool free of the mold.

2. Apparatus comprising a shaft, a platform rotatable about the shaft supporting a plurality of molds, means to rotate the molds, a second platform also rotatable about the shaft positioned above the first platform and supporting a plurality of forming means each including a radially disposed arm pivotable adjacent the inner end, a sleeve adjacent the outer end of the arm adapted for axial movement along the arm and supporting a tool insertable in a mold, cam means positioned over the second platform to urge the sleeve along the arm, to lower the arm, and to raise the arm and thereby maintain the tool free of the mold, said cam means being synchronized with respect to each other to perform said functions at a desired time.

3. Apparatus for the multiple forming of containers comprising a shaft, a turntable on the shaft, means to rotate the shaft, a plurality of radially disposed supporting heads for molds on the turntable, means to rotate the heads, a second turntable on the shaft positioned above the first, a plurality of forming means on the second turntable in substantial vertical alignment with the heads, each forming means including a radially disposed arm vertically pivotable adjacent the inner end, a sleeve adjacent the outer end of the arm adapted for axial movement, a forming tool supported by the sleeve and insertable into the head, stationary cam means positioned over the second turntable including a cam for urging the sleeve along the arm, a second cam to lower the arm, and a third cam to raise the arm and thereby maintain the tool free of the head, said cams being synchronized with respect to each other to perform said functions in a time-spaced relation, and resilient means to oppose the movement of the sleeve and downward movement of the arm.

4. A jiggering machine comprising a fixed post, a tubular shaft on the post, means to rotate the shaft about the post, a turntable fixed to the shaft, a plurality of radially disposed supporting heads on the turntable, a container-forming mold in each head having an opening on one side, means to rotate the heads, a second turntable supported above the first by an intervening collar, a plurality of forming means on the second turntable in substantial vertical alignment with the molds, each forming means including a radially disposed bell crank lever having the bottom one of two arms positioned near the opening of a mold, a sleeve mounted on the outer end of this arm and adapted for axial movement, and a roller tool supported by the sleeve insertable into the mold for rotatable engagement therewith, stationary cam means supported by the upper end of the post whereby as the turntables rotate about the post, one cam urges the sleeve toward the outer end of the arm, a second cam engages the upper arm of the bell crank lever to lower the bottom arm, and another cam engages the upper arm to raise the bottom arm, all of such cam-actuated motions being performed in a time-spaced relation, resilient means to oppose the described movement of the sleeve including a finger member projecting from the end of the arm and surrounded by a spring whereby the described movement of the sleeve compresses the spring, and additional resilient means to oppose the downward movement of the arm whereby engagement of the upper arm of the lever with the cam means for raising the bottom arm is facilitated.

5. A roller tool jiggering machine for the multiple forming of containers comprising a fixed post, a tubular shaft on the post, means to rotate the shaft about the post, a turntable fixed to the shaft, a plurality of rotatable spindles radially disposed on the turntable and extending therethrough, a supporting head at one end of each spindle and a sheave at the other, a container-forming mold in each head having an opening on one side adapted to receive a charge of plastic material to be formed, means to rotate the spindle sheaves, a second turntable supported above the first by an intervening collar concentric with the post, a plurality of forming means on the second turntable in substantial vertical alignment with the molds, each forming means including a radially disposed bell crank lever having the bottom one of two arms positioned near the opening of a mold, a sleeve adjacent the outer end of this arm adapted for axial movement along the arm, and a forming roller tool supported by the sleeve insertable into the mold through the opening for rotatable engagement therewith, stationary cam means supported by the upper end of the post including two superposed sector-shaped cams, and a curved strip cam, the latter cam and the upper sector-shaped cam being in substantially the same plane to provide substantially 360° of cam-controlled action whereby as the turntables rotate in unison about the post, the lower sector-shaped cam urges the sleeve outwardly, the upper sector-shaped cam engages the upper arm of the bell crank lever to lower the bottom arm, and the curved strip cam catches the same upper bell crank arm to raise the bottom arm, all of such cam-actuated motions being performed in a time-spaced relation, and resilient means opposing the outward movement of the sleeve and downward movement of the bottom arm to insure constant engagement of those members with a cam.

6. A roller tool jiggering machine as claimed in claim 5 wherein the means to rotate the spindle sheaves comprises a belt extending around the turntable to engage the sheaves and means to drive the length of the belt contacting the sheaves in a direction opposite to the direction of travel of the turntable.

7. A jiggering machine including a turntable, a plurality of molds on the turntable, means to rotate the molds, a plurality of forming means stationed above the molds, each forming means including an arm pivotable adjacent one end, a sleeve mounted on the outer end of the arm and adapted for axial movement, and a roller tool supported by the sleeve engageable with the mold, stationary cams positioned above the forming means whereby as the turntable turns one cam urges the sleeve toward the outer end of the arm, a second cam lowers the arm, and a third cam raises the arm, all of such cam-actuated motions being performed in a time-spaced relation, resilient means to oppose the described movement of the sleeve, and additional resilient means to oppose the downward movement of the arm.

8. Apparatus for forming a hollow article including a mold, means for rotating the mold, an arm pivotable adjacent one end, a sleeve on the arm adapted for axial movement along the arm, a tool supported by the sleeve and engageable with the mold, and cam means to control the travel of the sleeve along the arm and pivot the arm whereby at a desired time the tool is automatically free of engagement with the mold and withdrawn therefrom to enable the article to be removed.

9. Apparatus for forming a container from plastic material including a mold, means for rotating the mold, an arm pivotable adjacent one end, a sleeve on the arm adapted for axial movement along the arm, resilient means to oppose the outward movement of the sleeve, a tool supported by the sleeve, a cam to control the movement of the sleeve along the arm whereby at a desired time the tool is moved relatively to the mold to disengage it therefrom, and a cooperating cam to withdraw the tool from the mold at said time whereby a formed container can be removed from the mold and replaced with additional plastic material.

10. Apparatus for forming a container including a mold, means to rotate the mold, a bell crank lever having a first arm positioned near the mold, a sleeve on the first arm adapted for axial movement along the arm, resilient means on the first arm to oppose the outward movement of the sleeve, a tool supported by the sleeve and engageable with the mold, a first cam engageable with the second arm of the bell crank lever to lower the first arm and thereby engage the tool with the mold, resilient means to oppose the downward movement of the first arm, a second cam synchronized with the first to control the travel of the sleeve along the first arm whereby the tool is moved relatively to the mold to form the container and at a desired time the tool is disengaged from the mold, and a third cam to withdraw the tool from the mold at said time whereby the formed container may be removed from the mold and replaced with additional container-forming material before the first cam re-engages the tool with the mold.

11. Apparatus for continuously forming a plurality of containers including a plurality of molds, means to rotate each mold, a bell crank lever for each mold having a first arm positioned near the mold, a sleeve on the first arm adapted for axial movement along the arm, resilient means on the first arm to oppose the outward movement of the sleeve, a roller tool supported by the sleeve and insertable in the mold, a first cam engageable with the second arm of the bell crank lever to lower the first arm and thereby insert the tool in the mold, resilient means to oppose the downward movement of the first arm whereby initial engagement of the second arm of the lever with said first cam is facilitated, a second cam synchronized with the first to control the travel of the sleeve along the first arm whereby the roller also moves along the first arm relatively to the mold while inserted therein to form the container and is finally left in a position free of contact with the mold, a third cam synchronized with the previous two to retract the tool from the mold when in said final position whereby the container can be removed from the mold and replaced with additional container-forming material before the first cam reinserts the tool in the mold.

12. Apparatus as claimed in claim 9 wherein the resilient means opposing the outward movement of the sleeve includes a finger member projecting from the end of the pivotable arm and a spring concentric with the finger whereby the described movement of the sleeve compresses the spring.

References Cited in the file of this patent

UNITED STATES PATENTS

| | | |
|---|---|---|
| 1,762,387 | Dengler | June 10, 1930 |
| 2,293,070 | Miller et al. | Aug. 18, 1942 |
| 2,619,701 | Jordan | Dec. 2, 1952 |
| 2,629,160 | Briggs | Feb. 24, 1953 |

FOREIGN PATENTS

| | | |
|---|---|---|
| 326,213 | Great Britain | Mar. 4, 1930 |
| 610,759 | Great Britain | Oct. 20, 1948 |
| 47,435 | Sweden | July 21, 1920 |